US012480628B1

(12) United States Patent
Qin et al.

(10) Patent No.: US 12,480,628 B1
(45) Date of Patent: Nov. 25, 2025

(54) LED LIGHT STRING AND LIGHT NECKLACE

(71) Applicant: ACE SMART&TECH (NINGBO) CO., LTD., Ningbo (CN)

(72) Inventors: Yanbei Qin, Ningbo (CN); Wanni Qin, Ningbo (CN)

(73) Assignee: ACE SMART&TECH (NINGBO) CO., LTD., Ningbo (CN)

( * ) Notice: Subject to any disclaimer, the term of this patent is extended or adjusted under 35 U.S.C. 154(b) by 0 days.

(21) Appl. No.: 18/918,111

(22) Filed: Oct. 17, 2024

(30) Foreign Application Priority Data

May 22, 2024 (CN) ......................... 202421124350.4

(51) Int. Cl.
*F21S 4/10* (2016.01)
*F21V 23/06* (2006.01)

(52) U.S. Cl.
CPC ................ *F21S 4/10* (2016.01); *F21V 23/06* (2013.01)

(58) Field of Classification Search
CPC .... A63F 2009/002; A63F 2250/49; F21S 4/10
See application file for complete search history.

(56) References Cited

U.S. PATENT DOCUMENTS

2006/0044788 A1 * 3/2006 Damrau .................... F21S 4/10
362/249.14

FOREIGN PATENT DOCUMENTS

| | | | | |
|---|---|---|---|---|
| CN | 106418933 | A | * | 2/2017 |
| CN | 106539208 | A | | 3/2017 |
| CN | 215776005 | U | * | 2/2022 |
| DE | 202021101202 | U1 | * | 4/2021 |

OTHER PUBLICATIONS

Iinnovation Q+ NPL Search (Year: 2024).*

* cited by examiner

*Primary Examiner* — Anabel Ton

(74) *Attorney, Agent, or Firm* — Andrew C. Cheng

(57) ABSTRACT

Disclosed is an LED light string, comprising: a light string body, which comprises a first power transmission line, a second power transmission line and a light-emitting element; a first connector, one end of the first power transmission line and one end of the second power transmission line are located in the first connector; a power supply element, which is located in the first connector, and the first power transmission line and the second power transmission line are both electrically connected to the power supply element; a second connector, the other end of the first power transmission line and the other end of the second power transmission line are located in the second connector, and the second connector is detachably connected to the first connector. The LED light string provided in the present disclosure can be hung as a strip structure or worn as a ring structure.

19 Claims, 5 Drawing Sheets

LED LIGHT STRING AND LIGHT NECKLACE

TECHNICAL FIELD

The present disclosure belongs to the technical field of lamps and relates to an LED light string and a light necklace.

BACKGROUND

Presently, luminous jewelry is a special type of jewelry in the field of jewelry. By installing batteries and LED lights in the jewelry, the combination of light and jewelry is realized, so that the jewelry has more extensive purposes and becomes more popular with consumers. Luminous necklaces are one of the more popular luminous jewelry, and are particularly suitable for festivals such as Christmas and Halloween in some European and American countries. This luminous necklace can be worn on the neck or hung on objects such as Christmas trees. There are numerous ways to use luminous jewelry, which can enhance and foil the festive atmosphere.

For example, the Chinese invention patent with application number CN201611206968.5 provides a connecting structure of a luminous necklace, including a chain rope, which is wound into a spiral shape by at least two wires; a lamp holder, which is connected to the chain rope and can be fixed on the chain rope; and a lampshade, which is connected to the lamp holder in a plug-in mode.

In summary, some existing technical solutions only provide a separate luminous necklace structure, which still needs an external power supply for power supply and cannot be used independently. Therefore, it is inconvenient to use, and there is a large room for improvement.

SUMMARY

An object of the present disclosure is to solve the aforementioned problems in the prior art and provide an LED light string and a light necklace.

The object of the present disclosure can be achieved by the following technical solutions: an LED light string, comprising: a light string body, which comprises a first power transmission line, a second power transmission line and a light-emitting element, one end of the light-emitting element is connected to a middle section of the first power transmission line and the other end is connected to a middle section of the second power transmission line;

a first connector, one end of the first power transmission line and one end of the second power transmission line are located in the first connector;

a power supply element, which is located in the first connector, and the first power transmission line and the second power transmission line are both electrically connected to the power supply element;

a second connector, the other end of the first power transmission line and the other end of the second power transmission line are located in the second connector, and the second connector is detachably connected to the first connector.

In the aforementioned LED light string, the first connector is provided with a first protrusion, the second connector is provided with a first groove, and the first protrusion can be inserted into the first groove.

In the aforementioned LED light string, the first connector is provided with a first groove, the second connector is provided with a first protrusion, and the first protrusion can be inserted into the first groove.

In the aforementioned LED light string, a side wall of the first protrusion is provided with a snap-on protrusion, the first groove is provided with a snap-on depression, and the snap-on protrusion can be inserted into the snap-on depression.

In the aforementioned LED light string, a side wall of the first protrusion is provided with a snap-on depression, the first groove is provided with a snap-on protrusion, and the snap-on protrusion can be inserted into the snap-on depression.

In the aforementioned LED light string, the LED light string further comprises a decorative piece, the decorative piece is provided with a decorative cavity and a preformed hole, the preformed hole is in communication with the decorative cavity, the first power transmission line and the second power transmission line pass through the preformed hole and the light-emitting element is located in the decorative cavity, and the decorative piece covers the light-emitting element.

In the aforementioned LED light string, the decorative piece comprises a first shell and a second shell, the second shell is detachably connected to the first shell to form the decorative cavity and the preformed hole.

In the aforementioned LED light string, the LED light string further comprises a circuit board, the circuit board is arranged in the first connector, the first connector is provided with a control button, both the power supply element and the control button are electrically connected to the circuit board, and the control button can control the power supply of the power supply element by means of the circuit board.

In the aforementioned LED light string, the LED light string further comprises a charging connector, the charging connector is arranged on the first connector, the charging connector is electrically connected to the power supply element by means of the circuit board, and the charging connector can charge the power supply element by means of the circuit board.

In the aforementioned LED light string, the power supply element is a rechargeable battery.

In the aforementioned LED light string, when the second connector is connected to the first connector, the two connectors are assembled to form an accommodating cavity, and the charging connector is located in the accommodating cavity.

In the aforementioned LED light string, the light-emitting element is a plug-in lamp or a SMD lamp.

Furthermore, the present disclosure also provides a light necklace, comprising the LED light string.

In the aforementioned light necklace, there are at least two LED light strings, and the first connector of one LED light string is detachably connected to the second connector of another LED light string.

Compared with the prior art, the present disclosure can achieve the following beneficial effects:

1. The LED light string can be hung as a strip structure or worn as a ring structure by means of a detachable connection between the second connector and the first connector; meanwhile, because of the built-in power supply element, there is no need of an external power supply for power supply, and the LED light string can be used independently, which is very convenient.

2. The first connector and the second connector can be plugged into the first groove by means of the first protrusion, so that the LED light string can switch back and forth between a ring structure and a strip structure.

3. The first connector and the second connector can be plugged into the plug-in depression by means of the snap-in protrusions on the side wall, so as to ensure that the first protrusion will not fall out easily when being inserted into the first groove, thereby preventing the LED light string from falling.

4. The light-emitting element is located in the decorative cavity and the decorative piece can decorate and protect the light-emitting element, and the decorative piece can be of various colors, and the decorative pieces with different colors can change the light emitted by the light-emitting element through the decorative piece.

5. The charging connector is electrically connected to the power supply element by means of the circuit board, and the power supply element can be charged so that the LED light string can be used repeatedly.

6. The second connector is connected to the first connector to form an accommodating cavity in which the charging connector can be wrapped, so that the charging connector is protected from damage under a non-charging state.

7. A plurality of LED light strings can be connected in series by connecting the first connector of one LED light string with the second connector of another LED light string to finally form a large closed loop.

Figure 1:
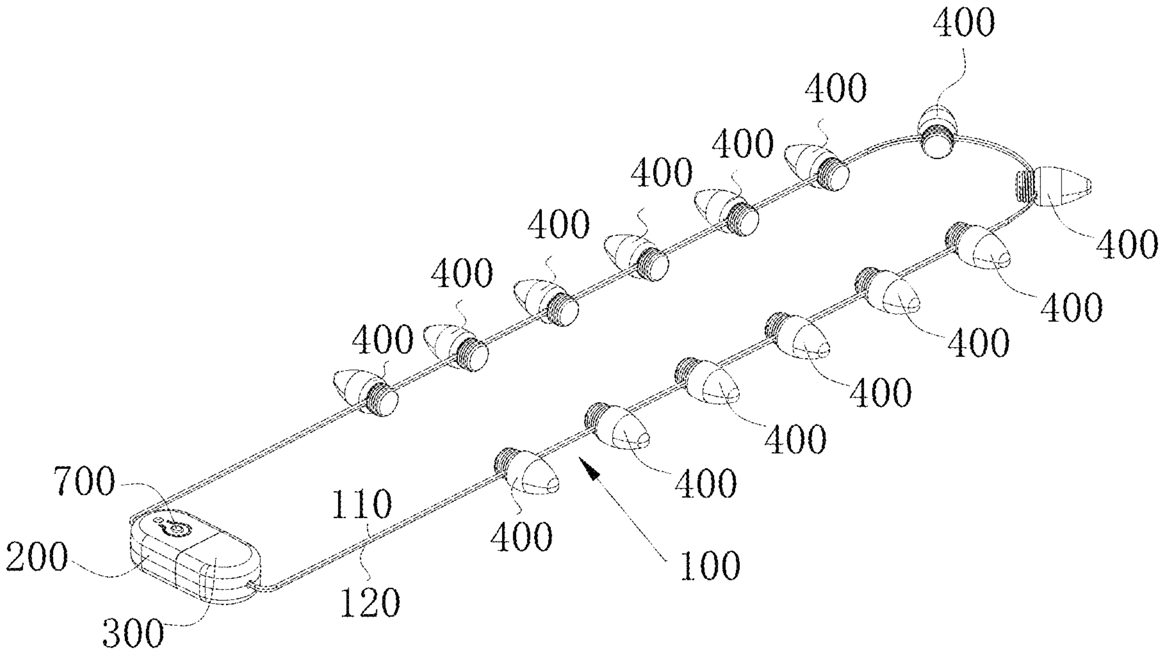
FIG. 1 is a structural schematic diagram of an LED light string of the present disclosure.

Reference numerals: 100, light string body; 110, first power transmission line; 120, second power transmission line; 130, light-emitting element; 200, first connector; 210, first protrusion; 211, snap-on protrusion; 220, charging connector; 300, second connector; 310, first groove; 311, snap-on depression; 400, decorative piece; 410, decorative cavity; 420, preformed hole; 430, first shell; 440, second shell; 500, power supply element; 600, circuit board; 700, control button; 800, accommodating cavity.

DETAILED DESCRIPTION OF THE EMBODIMENTS

The technical solutions of the present disclosure will be further described below in conjunction with the specific embodiments and accompanying drawings, but the present disclosure is not limited to these embodiments.

It should be noted that all directional indications (such as up, down, left, right, front, back, etc.) in the embodiments of the present disclosure are only used to explain the relative position relationship, movement, etc. between the components under a specific posture (as shown in the figures). If the specific posture changes, the directional indication will also change accordingly.

Furthermore, in the present disclosure, the descriptions such as "first", "second", "one", etc. are only used for descriptive purposes, and should not be construed as indicating or implying their relative importance or implicitly indicating the number of technical features indicated. Therefore, the features defined as "first" and "second" may explicitly or implicitly include at least one of the features. In the description of the present disclosure, "multiple" means at least two, for example, two, three, etc., unless otherwise clearly and specifically defined.

In the present disclosure, unless otherwise clearly specified and defined, the terms "connection/connected", "fix/fixed", etc. should be understood in a broad sense. For example, "fix/fixed" can be fixedly connected, detachably connected or integrated; can be mechanically connected or electrically connected; can be directly connected or indirectly connected through an intermediate medium, can be internally communicated or mutually interacted between two elements, unless otherwise clearly defined. For those skilled in the art, the specific meanings of the above terms in the present disclosure can be understood according to specific circumstances.

Furthermore, the technical solutions between various embodiments of the present disclosure can be mutually combined provided that these solutions can be achieved by a person of ordinary skill in the art. When the combination of technical solutions is contradictory or cannot be implemented, it should be considered that such a combination of technical solutions does not exist and is not within the scope of protection of the present disclosure.

The specific embodiments described herein are merely examples of the present disclosure. Those skilled in the art of the present disclosure may make various modifications or supplements to the specific embodiments described or substitute them in a similar manner, but these modifications, supplements and substitutions will not deviate from the spirit of the present disclosure or exceed the scope of protection defined in the appended claims.

Figure 2:
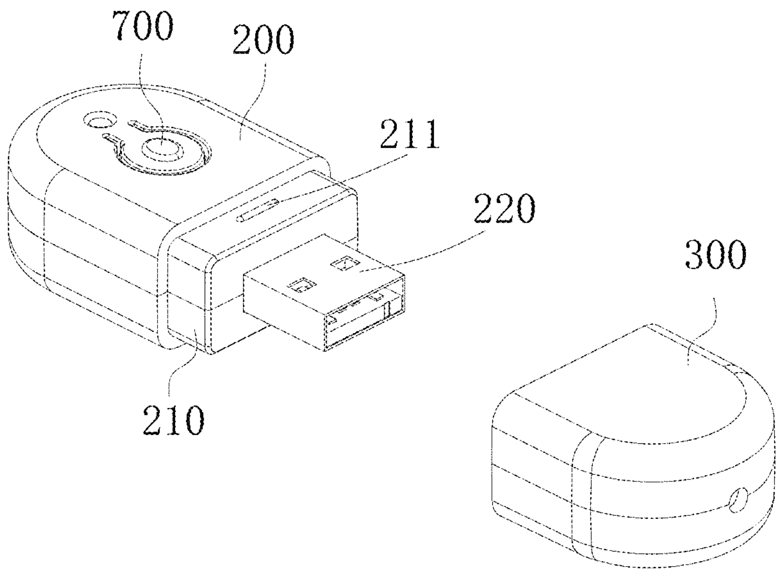
FIG. 2 is an exploded view of a first connector and a second connector of the present disclosure.
Figure 3:
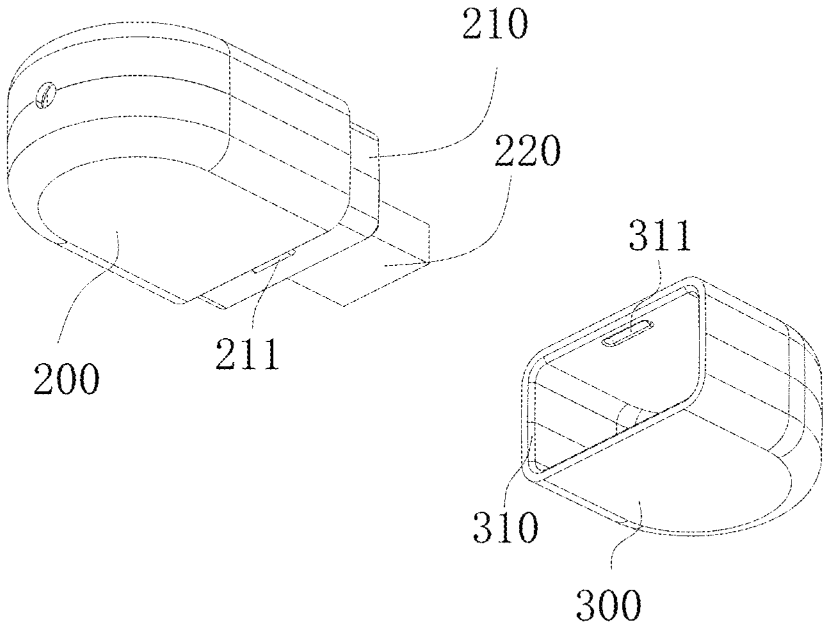
FIG. 3 is an exploded view of a first connector and a second connector of the present disclosure from another perspective.
Figure 4:
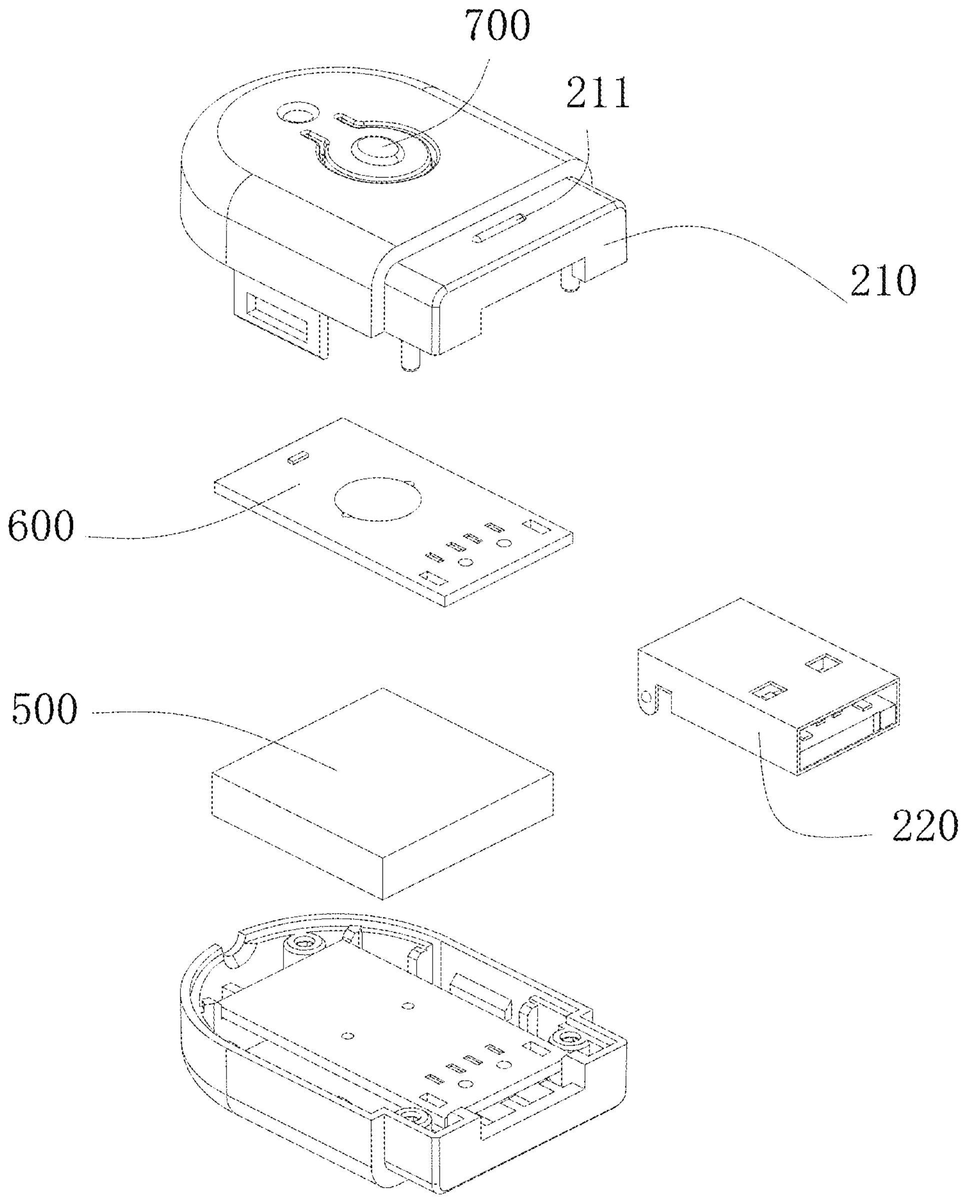
FIG. 4 is an exploded view of a first connector of the present disclosure.
Figure 5:
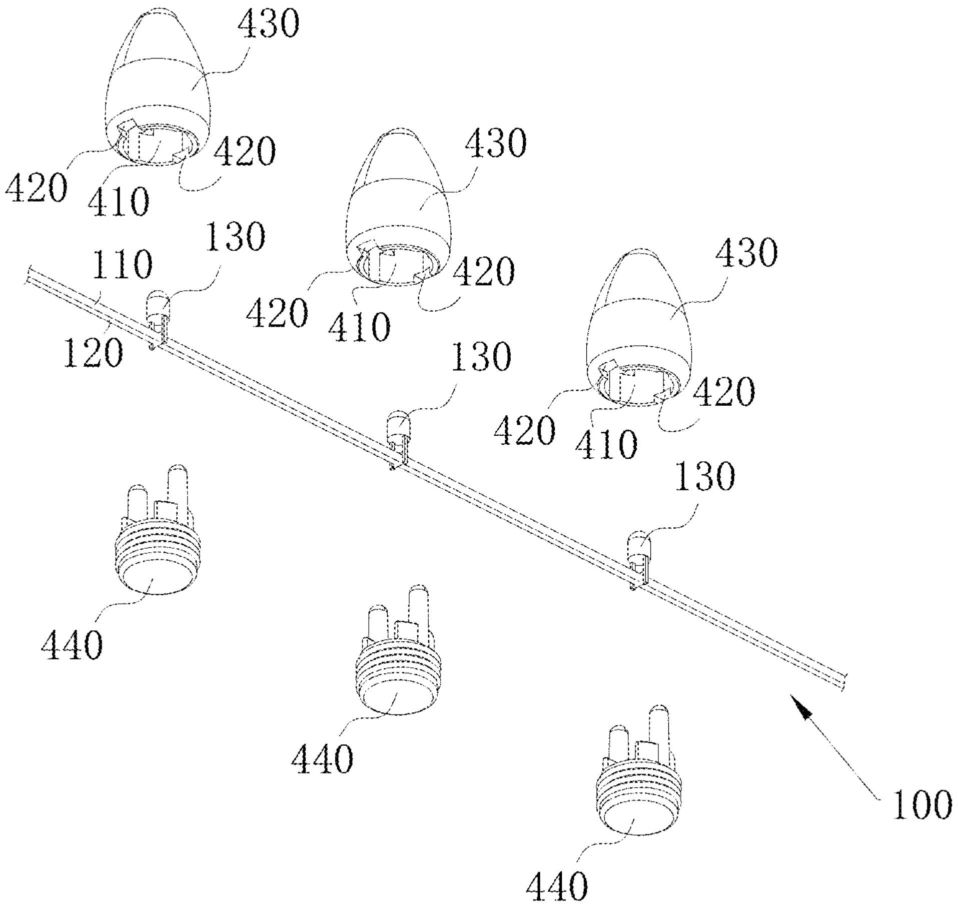
FIG. 5 is an exploded view of a light string body and a decorative piece of the present disclosure.

As shown in FIG. 1 to FIG. 5, an LED light string comprises: a light string body 100, a first connector 200, a second connector 300 and a power supply element 500.

Wherein, the light string body 100 comprises a first power transmission line 110, a second power transmission line 120, a light-emitting element 130, the first connector 200, and the second connector 300; one end of the light-emitting element 130 is connected to a middle section of the first power transmission line 110 and the other end is connected to a middle section of the second power transmission line 120.

Specifically, the structure of the light-emitting element 130 is not particularly limited. The light-emitting element 130 may be a plug-in light, or a SMD light, or other structures.

Wherein, the first connector 200 is connected to one end of the first transmission line 110 and one end of the second transmission line 120.

Wherein, the second connector 300 is connected to the other end of the first transmission line 110 and the other end of the second transmission line 120.

Specifically, the detachable connection between the second connector 300 and the first connector 200 may be a mortise and tenon connection, a plug-in connection, a snap-on connection, or other detachable connections.

Wherein, the power supply element 500 is located in the first connector 200, and the first power transmission line 110 and the second power transmission line 120 are both electrically connected to the power supply element 500.

Specifically, the power supply element 500 may be a rechargeable battery, or may be a dry battery, or may be other batteries.

In this embodiment, the LED light string can be hung as a strip structure or worn as a ring structure by means of a detachable connection between the second connector 300 and the first connector 200. Meanwhile, because of the built-in power supply element 500, there is no need of an external power supply for power supply, and the LED light string can be used independently, which is very convenient.

As shown in FIG. 1 to FIG. 5, based on the above embodiment, the first connector 200 is provided with a first protrusion 210, and the second connector 300 is provided with a first groove 310, and the first protrusion 210 can be inserted into the first groove 310.

As another embodiment, the first connector 200 may be provided with a first groove 310, and the second connector 300 may be provided with a first protrusion 210, and the first protrusion 210 may be inserted into the first groove 310.

In this embodiment, the first connector 200 and the second connector 300 can be plugged into the first groove 310 by means of the first protrusion 210, so that the LED light string can switch back and forth between a ring structure and a strip structure.

As shown in FIG. 1 to FIG. 5, based on the above embodiment, a side wall of the first protrusion 210 is provided with a snap-on protrusion 211, the first groove 310 is provided with a snap-on depression 311, and the snap-on protrusion 211 can be inserted into the snap-on depression 311.

As another embodiment, a side wall of the first protrusion 210 is provided with a snap-on depression 311, the first groove 310 is provided with a snap-on protrusion 211, and the snap-on protrusion 211 can be inserted into the snap-on depression 311.

In this embodiment, the first connector 200 and the second connector 300 can be plugged into the plug-in depression 311 by means of the snap-in protrusions 211 on the side wall, so as to ensure that the first protrusion 210 will not fall out easily when being inserted into the first groove 310, thereby preventing the LED light string from falling.

As shown in FIG. 1 to FIG. 5, based on the above embodiment, the LED light string further comprises a decorative piece 400, the decorative piece 400 is provided with a decorative cavity 410 and a preformed hole 420, the preformed hole 420 is in communication with the decorative cavity 410, the first power transmission line 110 and the second power transmission line 120 pass through the preformed hole 420 and the light-emitting element 130 is located in the decorative cavity 410, and the decorative piece 400 covers the light-emitting element 130.

Specifically, the appearance of the decorative piece 400 is not particularly limited, and may be in a pineapple shape, a light bulb shape, or other shapes.

In this embodiment, the light-emitting element 130 is located in the decorative cavity 410 and the decorative piece 400 can decorate and protect the light-emitting element 130. The decorative piece 400 can be of various colors, and the decorative pieces 400 with different colors can change the light emitted by the light-emitting element 130 through the decorative piece 400.

As shown in FIG. 1 to FIG. 5, based on the above embodiment, the decorative piece 400 comprises a first shell 430 and a second shell 440, the second shell 440 is detachably connected to the first shell 430 and is formed with the decorative cavity 410 and the preformed hole 420.

Specifically, a detachable connection between the second shell 440 and the first shell 430 is not particularly limited, and may be a snap-on connection, or a plug-in connection, or a bolt and nut connection.

In this embodiment, the second shell 440 is detachably connected to the first shell 430 to form a decorative cavity 410 and a preformed hole 420, so that the decorative piece 400 can be detachably mounted without affecting the first power line 110 and the second power line 120.

As shown in FIG. 1 to FIG. 5, based on the above embodiment, the LED light string further comprises a circuit board 600, the circuit board 600 is arranged in the first connector 200, the first connector 200 is provided with a control button 520, both the power supply element 500 and the control button 520 are electrically connected to the circuit board 600, and the control button can control the power supply of the power supply element 500 by means of the circuit board 600.

As shown in FIG. 1 to FIG. 5, based on the above embodiment, the LED light string further comprises a charging connector 220, the charging connector 220 is arranged on the first connector 200, the charging connector 220 is electrically connected to the power supply element 500 by means of the circuit board 600, and the charging connector 220 can charge the power supply element 500 by means of the circuit board 600.

It is worth noting that, in this embodiment, the power supply element 500 is a rechargeable battery.

Specifically, the charging connector 220 may be a USB Type-A connector, or other connectors.

In this embodiment, the charging connector 220 is electrically connected to the power supply element 500 by means of the circuit board 600, and the power supply element 500 can be charged so that the LED light string can be used repeatedly.

As shown in FIG. 1 to FIG. 5, based on the above embodiment, when the second connector 300 is connected to the first connector 200, the two connectors are assembled to form an accommodating cavity 800, and the charging connector 220 is located in the accommodating cavity 800.

In this embodiment, the second connector 300 is connected to the first connector 200 to form an accommodating cavity 800 in which the charging connector 220 can be wrapped, so that the charging connector 220 is protected from damage under a non-charging state.

As shown in FIG. 1 to FIG. 5, the present disclosure also provides a light necklace comprising the LED light string. There are at least two LED light strings, and the first connector 200 of one LED light string is detachably connected to the second connector 300 of another LED light string.

Specifically, the detachable connection between the first connector 200 of one LED light string and the second connector 300 of another LED light string can be a mortise and tenon connection, or a plug-in connection, or a snap-on connection, or other detachable connections.

In this embodiment, a plurality of LED light strings can be connected in series by connecting the first connector 200 of one LED light string with the second connector 300 of another LED light string to finally form a large closed loop.

It is worth noting that various lighting effects can be achieved by connecting a plurality of LED light strings and arranging and combining them at will.

What is claimed is:

1. An LED light string, comprising:

a light string body, which comprises a first power transmission line, a second power transmission line and a light-emitting element, one end of the light-emitting element is connected to a middle section of the first power transmission line and the other end is connected to a middle section of the second power transmission line;

a first connector, one end of the first power transmission line and one end of the second power transmission line are located in the first connector;

a power supply element, which is located in the first connector, and the first power transmission line and the second power transmission line are both electrically connected to the power supply element;

a second connector, the other end of the first power transmission line and the other end of the second power transmission line are located in the second connector, and the second connector is detachably connected to the first connector; and wherein the first connector is provided with a first protrusion, the second connector is provided with a first groove, and the first protrusion can be inserted into the first groove.

2. An LED light string, comprising:

a light string body, which comprises a first power transmission line, a second power transmission line and a light-emitting element, one end of the light-emitting element is connected to a middle section of the first power transmission line and the other end is connected to a middle section of the second power transmission line;

a first connector, one end of the first power transmission line and one end of the second power transmission line are located in the first connector;

a power supply element, which is located in the first connector, and the first power transmission line and the second power transmission line are both electrically connected to the power supply element;

a second connector, the other end of the first power transmission line and the other end of the second power transmission line are located in the second connector, and the second connector is detachably connected to the first connector; and wherein the first connector is provided with a first groove, the second connector is provided with a first protrusion, and the first protrusion can be inserted into the first groove.

3. The LED light string of claim 1, wherein a side wall of the first protrusion is provided with a snap-on protrusion, the first groove is provided with a snap-on depression, and the snap-on protrusion can be inserted into the snap-on depression.

4. The LED light string of claim 1, wherein a side wall of the first protrusion is provided with a snap-on depression, the first groove is provided with a snap-on protrusion, and the snap-on protrusion can be inserted into the snap-on depression.

5. The LED light string of claim 1, wherein the LED light string further comprises a decorative piece, the decorative piece is provided with a decorative cavity and a preformed hole, the preformed hole is in communication with the decorative cavity, the first power transmission line and the second power transmission line pass through the preformed hole and the light-emitting element is located in the decorative cavity, and the decorative piece covers the light-emitting element.

6. The LED light string of claim 5, wherein the decorative piece comprises a first shell and a second shell, the second shell is detachably connected to the first shell to form the decorative cavity and the preformed hole.

7. The LED light string of claim 1, wherein the LED light string further comprises a circuit board, the circuit board is arranged in the first connector, the first connector is provided with a control button, both the power supply element and the control button are electrically connected to the circuit board, and the control button can control the power supply of the power supply element by means of the circuit board.

8. The LED light string of claim 7, wherein the power supply element is a rechargeable battery.

9. The LED light string of claim 8, wherein the LED light string further comprises a charging connector, the charging connector is arranged on the first connector, the charging connector is electrically connected to the power supply element by means of the circuit board, and the charging connector can charge the power supply element by means of the circuit board.

10. The LED light string of claim 9, wherein when the second connector is connected to the first connector, the two connectors are assembled to form an accommodating cavity, and the charging connector is located in the accommodating cavity.

11. A light-emitting necklace, comprising the LED light string of claim 1.

12. The light-emitting necklace of claim 11, wherein there are at least two LED light strings, and the first connector of one LED light string is detachably connected to the second connector of another LED light string.

13. The LED light string of claim 2, wherein the LED light string further comprises a decorative piece, the decorative piece is provided with a decorative cavity and a preformed hole, the preformed hole is in communication with the decorative cavity, the first power transmission line and the second power transmission line pass through the preformed hole and the light-emitting element is located in the decorative cavity, and the decorative piece covers the light-emitting element.

14. The LED light string of claim 4, wherein the decorative piece comprises a first shell and a second shell, the second shell is detachably connected to the first shell to form the decorative cavity and the preformed hole.

15. The LED light string of claim 2, wherein the LED light string further comprises a circuit board, the circuit board is arranged in the first connector, the first connector is provided with a control button, both the power supply element and the control button are electrically connected to the circuit board, and the control button can control the power supply of the power supply element by means of the circuit board.

16. The LED light string of claim 15, wherein the power supply element is a rechargeable battery.

17. The LED light string of claim 7, wherein the LED light string further comprises a charging connector, the charging connector is arranged on the first connector, the charging connector is electrically connected to the power supply element by means of the circuit board, and the charging connector can charge the power supply element by means of the circuit board.

18. The LED light string of claim 17, wherein when the second connector is connected to the first connector, the two connectors are assembled to form an accommodating cavity, and the charging connector is located in the accommodating cavity.

19. A light-emitting necklace, comprising the LED light string of claim 2.

* * * * *